United States Patent [19]

EerNisse et al.

[11] 4,078,226

[45] Mar. 7, 1978

[54] INPUT APPARATUS FOR DYNAMIC SIGNATURE VERIFICATION SYSTEMS

[75] Inventors: Errol P. EerNisse; Cecil E. Land; Jay B. Snelling, all of Albuquerque, N. Mex.

[73] Assignee: The United States of America as represented by the United States Department of Energy, Washington, D.C.

[21] Appl. No.: 778,189

[22] Filed: Mar. 16, 1977

[51] Int. Cl.² .............................................. G06K 9/00
[52] U.S. Cl. ............................ 340/146.3 SY; 310/311
[58] Field of Search ................ 340/146.3 SY; 178/18; 73/432 R, 432 A; 310/311, 314, 328, 330-333, 348; 338/2

[56] References Cited

U.S. PATENT DOCUMENTS

| | | | |
|---|---|---|---|
| 3,528,295 | 9/1970 | Johnson et al. | 340/146.3 SY |
| 3,563,097 | 2/1971 | Roggenstein et al. | 340/146.3 SY |
| 3,621,720 | 11/1971 | Clark | 340/146.3 SY |
| 3,805,601 | 4/1974 | Jeffers | 310/311 |
| 3,956,734 | 5/1976 | Radcliffe, Jr. | 340/146.3 SY |
| 3,988,934 | 11/1976 | Kamphoefner et al. | 338/2 |

OTHER PUBLICATIONS

Vredenbregt et al., "Analysis and Synthesis of Handwriting", *Philips Technical Review*, vol. 32, pp. 73–78, 1971.

*Primary Examiner*—Leo H. Boudreau
*Attorney, Agent, or Firm*—Dudley W. King; Robert Southworth, III; Robert W. Weig

[57] ABSTRACT

The disclosure relates to signature verification input apparatus comprising a writing instrument and platen containing piezoelectric transducers which generate signals in response to writing pressures.

13 Claims, 8 Drawing Figures

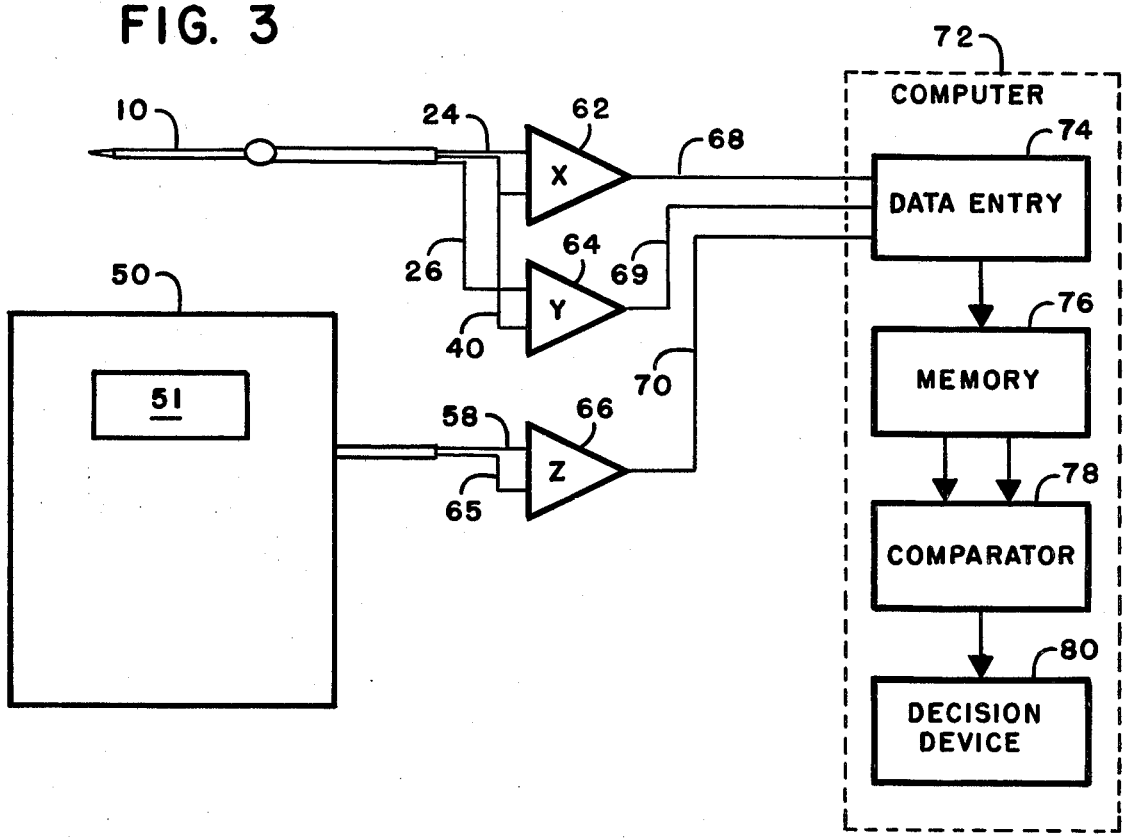

INPUT APPARATUS FOR DYNAMIC SIGNATURE VERIFICATION SYSTEMS

FIELD OF THE INVENTION

The invention relates to signature verification and more particularly to input apparatus providing electrical output representative of three dimensions of input for signature verification systems.

BACKGROUND OF THE INVENTION

A need exists for a verification device which would serve to identify, for example, personnel desiring entry into a secured area. It would be desirable to offer entry at various gates which would not need to be manned by security guards but where the identity of a person seeking entry or exit from such an area must be assured before such entry or exit.

One of the solutions toward assuring identification in such situations is that of signature verification. An individual desiring entry or exit utilizes a special writing instrument and/or special writing platen, either one of which produces electrical outputs in response to the individual's action of writing his signature, the outputs being dynamically representative of selected aspects of the handwriting action producing the signature. These outputs are compared to other outputs representative of past, sample or exemplary signatures from a data bank, such as a computer memory. This may be done by utilizing any one of a number of known computer programs in general purpose or special computers or hardwired comparator apparatus to verify with a high degree of accuracy that the individual submitting the signature is or is not the person he represents himself to be.

Several varieties of signature verification systems are known or are commercially available. One of these, disclosed in U.S. Pat. No. 3,983,535 to Herbst et al. utilizes input signals proportional to accelerations of the writing stylus in either "x" or "y" directions or both. The signals are in turn proportional to the muscle forces exerted by the signer, and are of predetermined consistant durations when performing particular strokes in a habitual signature. U.S. Pat. No. 3,983,535 suggests for use as input devices such commercially available x-y tablet or platen devices as typified by those disclosed in U.S. Pat. No. 3,668,313 to Dym and U.S. Pat. No. 3,582,962 to Mazza. However, each of the above noted x-y tablet devices produces analog signals proportional to x-y pen displacement or position and it is necessary to generate the second derivative with respect to time of pen displacement in order to obtain the acceleration information required for input to the system of U.S. Pat. No. 3,983,535.

A second variety of signal verification system is shown in U.S. Pat. No. 3,962,679 to Engelbrecht. The discriminant or input signal to this system is proportional to handwriting speed, where handwriting speeds is defined as the scalar magnitude of velocity or $$S = \sqrt{V_x^2 + V_y^2},$$

where $V_x$ and $V_y$ are the $x$ and $y$ velocity components, respectively, of the velocity of a stylus with respect to a writing surface. Also disclosed in this patent are optional additional or alternative discriminants in the form of a magnetic stylus and a platen capable of output signals proportional to handwriting pressure as well as $V_x$ and $V_y$ velocity components.

A third type of signature verification system which uses an input signal representing the variable pressure between a stylus and a writing surface exerted by a subject when writing a signature is disclosed in U.S. Pat. No. 3,959,769 to Sternberg et al. This patent discloses a pressure transducer which can consist of a stylus or pen having a strain gauge and a resistance bridge structure for generating an output voltage having an amplitude which varies as a function of the pressure exerted between the stylus and writing surface. Another input device comprising a pressure transducing platen for use in a signature verification system, such as that disclosed in U.S. Pat. No. 3,959,769, is described in U.S. Pat. No. 3,991,402 to Radcliffe, Jr. The device thereof employs a magnetic transducer to sense displacements of a writing platen along the z axis only, such displacements being proportional to the z-axis, i.e., downward, component of pressure or force exerted on the platen by handwriting.

An input device for a signature verification system which produces output signals proportional to $x$, $y$ and $z$ components of handwriting force is described in U.S. Pat. No. 3,988,934 to Kamphoefner et al. Their device consists of a writing platen suspended by a pair of thin horizontal beams to an intermediate surrounding structure. The intermediate structure is suspended by a similar pair of vertical beams to a rigid frame. The supporting beams for the writing platen and the intermediate structure have strain gauges attached to measure handwriting forces in the $x$, $y$ and $z$ directions. The $x$, $y$ and $z$ displacements of the supporting beams are proportional to the corresponding handwriting forces on the writing platen.

Input devices for signature verification systems cited above or otherwise known in the art comprise writing styli and/or platens which are sensitive to handwriting pressure, velocity, speed or acceleration or combinations thereof. These input devices employ transducers which need separate voltage or current sources such as strain gauges or magnetic transducers. In general, strain gauge transducers must be carefully selected and matched and are usually employed in resistive bridge circuits which require careful balancing. Such devices are generally expensive and vulnerable to damage through normal use or by inadvertent shock which may occur by dropping, etc., during normal use. Strain gauges must be bonded to somewhat flexible members because of their inherent insensitivity to very small strains. Magnetic devices are almost always cumbersome, susceptible to stray magnetic fields and expensive to fabricate.

SUMMARY OF THE INVENTION

In accordance with the present invention there is provided an input apparatus for dynamic signature verification systems comprising a bendable or slightly flexible shaft having a longitudinal axis and an inscribing tip to be applied by a writer using the instrument to a writing surface, a piezoelectric transducer contiguous to the flexible shaft which generates a first electrical signal in response to a slight flexure in the shaft in a first direction, a second signal generating piezoelectric transducer contiguous to the shaft and responsive to a slight flexure of the shaft in a second direction, and electrical conductors for conducting the first and second piezoelectric generated signals to a signal processing device. The slightly flexible shaft may receive and hold an inscribing tip for producing a visible record of its path on a writing surface, such as a ballpoint pen refill and is preferably conductive so as to serve as a ground relative to the first and second electrical signals. The piezoelectric transducers are preferably placed longitudinally along the flexible shaft and generally parallel to its longitudinal axis, lying in planes at about right angles to one another intersecting on the longitudinal axis of the shaft.

A pressure sensitive writing surface utilizing piezoelectric transducers may also be provided in order to produce an output representative of pen point pressure exerted during signature writing.

One object of the present invention is to provide inexpensive, reliable, effective personnel identification for entry and exit from secured premises.

Another object of the present invention is to provide dynamic signature verification.

One advantage of the present invention is that in accordance therewith signals representative of handwriting acceleration and/or forces are obtained from a writing instrument.

Another advantage of the present invention is that writing instruments in accordance therewith are relatively unbreakable in normal use.

Still another advantage of the present invention is that the piezoelectric transducers used in practicing the invention are inexpensive, need not be matched, and may be readily replaced if broken.

Yet another advantage of an apparatus in accordance with the invention is that no separate voltage, current or power source is needed.

BRIEF DESCRIPTION OF THE DRAWINGS

Other objects and advantages of the present invention will be apparent to those skilled in the art from the following description with reference to the appended drawings wherein like numbers denote like parts and wherein.

FIG. 3 is a block diagram of a signature verification system including input apparatus in accordance with the invention.

DETAILED DESCRIPTION OF A PREFERRED EMBODIMENT OF THE INVENTION

Figure 1:
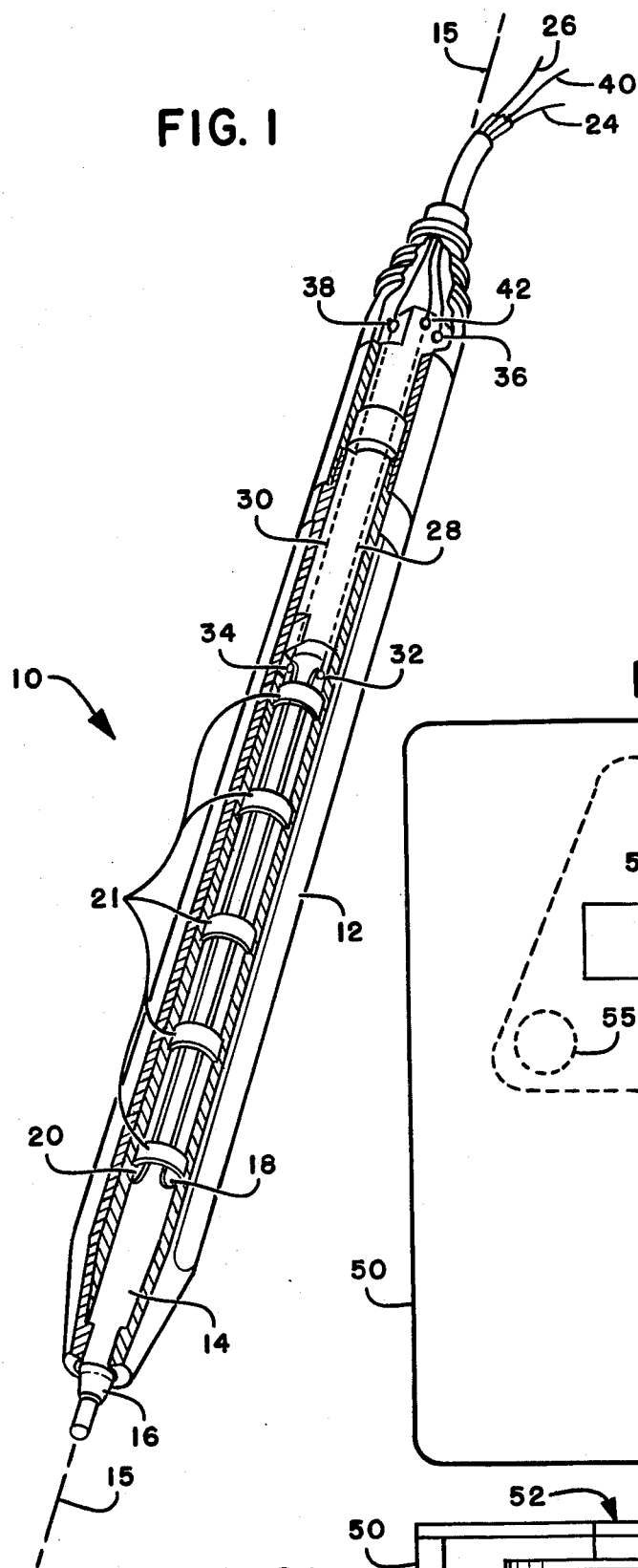
FIG. 1 illustrates a hand held writing instrument in accordance with the invention.

Reference is now made to FIG. 1 which illustrates a preferred embodiment of a hand held writing instrument in accordance with the present invention. The instrument 10 comprises an outer enclosure 12 which may be, for example, a typical plastic ballpoint pen casing, and a slightly bendable or flexible hollow conductive shaft 14 which may contain therein a ballpoint pen refill 16. It will be obvious to those skilled in the art that a mechanical pencil or other form of writing instrument such as a felt tip could also be used but it has been found that the ballpoint refill is easily replaced, not messy and can withstand extensive use and excessive handwriting pressure.

Shaft 14, to hold a standard 0.1215 inch diameter brass ballpoint ink filler, would preferably have a 0.122 inch inside diameter. Its outside diameter, if the shaft were formed of, for example, aluminum, could be about 0.180 inch and the shaft could be about 6 inches long.

Essentially parallel to the longitudinal axis 15 of the flexible shaft 14 are two piezoelectric transducers 18 and 20 which are preferably located at right angles to one another relative to the longitudinal axis of the writing instrument. The transducers 18 and 20 are maintained adjacent and contiguous to slightly flexible shaft 14 by, for example, slightly flexible bonding, tape, or non-conductive retaining clasps such as bands 21. Three, four or more piezoelectric transducers may be spaced generally parallel to one another about the circumference of shaft 14. Such a plurality of transducers may be equispaced or otherwise, in accordance with the invention. Too, a plurality of two or more transducers could be similarly disposed on the outside of and appropriately bonded to a slightly flexible writing instrument. Those skilled in the art will recognize that oppositely disposed transducers should be connected to provide additive signals so that their signals will not cancel one another.

Transducers 18 and 20 are preferably bimorph or multimorph piezoelectric transducers which offer a great advantage over strain gauges in that they require no separate power source but produce or generate their own signals in accordance with flexure exerted on them. In the preferred embodiment, transducers 18 and 20 are about 2.9 inches long, about 0.060 inch wide and about 0.020 inch thick. Naturally, these dimensions may vary. For example, the length may be from at least about 1.5 inches to 4 inches or longer, depending on the strength signal desired. Width and thickness may also be varied to supply desired output amplitudes for a particular application.

The piezoelectric material used in the preferred embodiment is Gulton G-1195 which is equivalent to Vernitron PZT-5B. Gulton G-1278 or Vernitron PZT-5H as well as other piezoelectric materials having similar properties may also be used.

Shaft 14, and hence transducers 18 and 20, are slightly flexed by writing pressure, which may be represented by components in "x" and "y" directions, during the use of instrument 10 as a hand held writing instrument. One transducer will therefor produce a signal representative of one component of flexure proportional to acceleration of the writing tip, such as the $x$ component, and the other transducer will similarly produce a signal representative of the $y$ component. Because these signals will be processed by separate signals conditioning amplifiers as will hereinafter be explained with reference to FIG. 3, the transducers need not be matched. Differences in output signal strengths can be compensated by appropriate calibration of the amplifiers. Transducers 18 and 20 are connected to wires 24 and 26 which carry the signals produced thereby to signal processing apparatus, such as that schematically illustrated in FIG. 3, for signature verification. Signal processing may occur, for example, in an appropriately programmed general purpose digital computer. Too, the outputs can be traced out such as shown in FIG. 4 by a strip chart recorder and compared by eye. Within the writing instrument itself are conductive leads 28 and 30 appropriately connected to the ends of piezoelectric transducers 18 and 20 at points 32 and 34 by, for example, silver epoxy or other conductive bond. Those skilled in the art will appreciate other forms of connection may be used. At points 38 and 42 leads 28 and 30 attach to wires 24 and 26. This arrangement prevents any strain or tension placed on leads 24 and 26 from being passed on to connections 32 and 34 and therefrom to transducers 18 and 20. A ground lead 40 attaches to the conductive shaft 14 at point 36 and may be soldered or otherwise affixed thereto by means well known in the art.

Instrument 10 may be used on any kind of relatively smooth writing surface available and will produce signals representative of the acceleration of the pen tip in $x$ and $y$ components, when an individual writes his particular signature. A single integration of the $x$ and $y$ component signals with respect to time will produce signals representative of velocity of the pen tip. It is desirable that the pen or shaft be always held with the same side up in order to provide essentially the same $x$ and $y$ axes basis for each signature. Thus, for each signature, transducers 18 and 20 will be essentially in the same relative positions. This is easily accomplished by having one side of the pen marked "this side up" or otherwise so that a user would always hold the pen in essentially the same position for his signature.

Figure 2A:
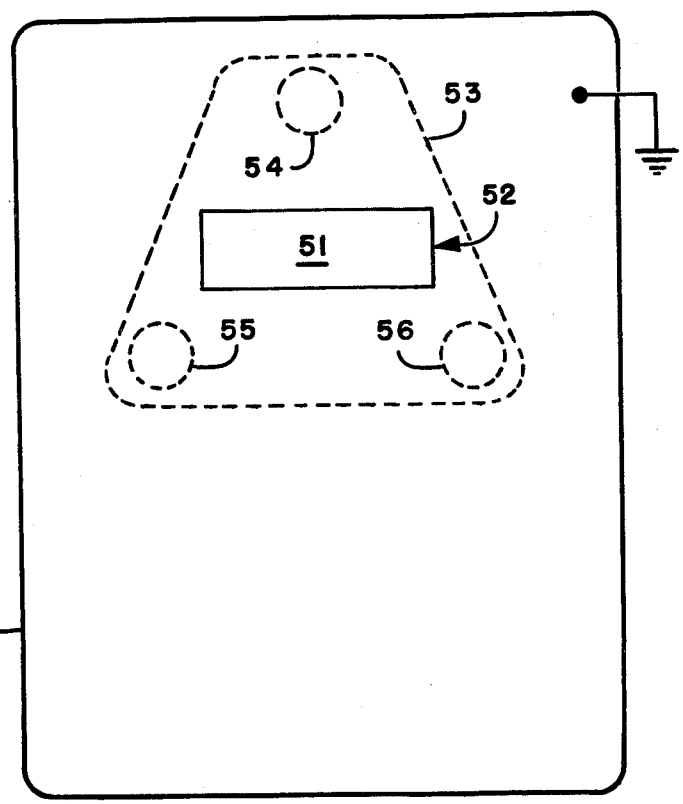
FIGS. 2a and 2b show a writing surface platen for use with the instrument of FIG. 1.
Figure 2B:
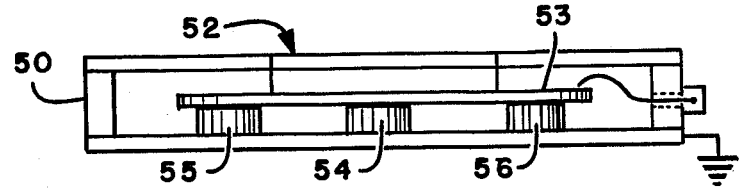

The writing instrument 10 may be used in conjunction with a platen such as the one shown in FIGS. 2a and 2b. In the embodiment illustrated, a conductive or metal enclosure 50 contains a metal plate 52, providing a raised rectangular writing surface. Plate 52 is disposed atop a larger, preferably trapezoidal metal plate 53 which is supported on three disk-shaped piezoelectric sensors or pressure transducers, 54, 55 and 56. Enclosure 50 may be used as a hand rest while a signature is being written on plate 51. Sensors 54, 55 and 56 may be connected electrically in parallel as shown in FIG. 2b or they may be connected in series, depending on the signal output level desired and on the input impedance of a z signal conditioning amplifier such as shown in FIG. 3.

The output current of each transducer can be calculated as follows. The electric displacement in the z direction $D_3$ is given by $$D_3 = d_{33} T_3 + E_{33}^T E_3, \quad (1)$$

where $d_{33}$ is the piezoelectric coefficient relating stress $T_3$ to electric displacement $D_3$, and $E_{33}^T$ is the dielectric coefficient relating the electric field $E_3$ and $D_3$ with stress held constant. Since $T_3 = F_3/a$, where $F_3$ is the force in the z direction and $a$ is the electroded area of the sensor and $E_3 = i_3 R/t$, where $i_3$ is the output current, R is the input resistance of the signal conditional amplifier and $t$ is the thickness of the sensor, equation (1) can be rewritten as $$a D_3 = d_{33} F_3 + E_{33} i_3 Ra/t \quad (2)$$

$$a D_3 = d_{33} F_3 + i_3 C_3 R \quad (3)$$

In (3) the capacitance $D_3 = E_{33} a/t$. Since $a D_3 = \int i_3 dt$ and we can assume the writing force $F_3$ is a function of time, $$\int i_3 dt = d_{33} F_3 + i_3 C_3 R$$

or $$i_3/jw = d_{33} F_3 + i_3 C_3 R. \quad (4)$$

From (4) the current $i_3$ is calculated as $$i_3 = (jw\, d_{33} F_3)/(1 - jw\, C_3 R) \quad (5)$$

Hence, the output current $i_3$ depends on the piezoelectric coefficient $d_{33}$, the capacitance of the sensor $C_3$, the input impedance of the signal conditioning amplifier R, and on the handwriting force or pressure applied to the writing platen. This writing pressure is substantially duplicated each time a signature is written and the outputs of the sensors may be compared by well known programs and comparators such as disclosed in U.S. Pat. Nos. 3,983,535, 3,962,679, 3,480,911, 3,621,720 and 3,699,517.

Piezoelectric sensors 54, 55 and 56 need not be matched because small differences in their output characteristics are not critical when they are connected in parallel, and such differences are of no consequence when they are connected in series. If one breaks during use another may be used to replace it without any matching. This feature makes the cost and maintenance of an apparatus in accordance with the invention very inexpensive in comparison to those using strain gauges which require matching for use in resistive bridge networks.

In instrument 10, the transducers 18 and 20 are slightly flexed with shaft 14. This flexure is proportional to the force applied to the instrument during a signature movement. In practicing the instant invention, the flexural force is proportional to the acceleration of the writing tip, assuming a somewhat constant coefficient of friction between the tip and the writing surface. Therefore, the $x-y$ oriented transducers produce signals which are representative of the acceleration of the pen in $x$ and $y$ component directions which in the preferred embodiment are at right angles to one another. The signals representative of acceleration may be once integrated to produce signals representative of pen velocity and twice integrated to yield signals representative of the displacement of the pen tip. This integration is easily carried out using electrical integrating circuits well known to those skilled in the art. In this manner three dimensions representative of a particular signature are obtainable from the signals representative of force produced by the transducers in the pen.

The hollow flexible shaft 14 should be of an appropriate stiffness or flexibility to allow for sufficient but not excessive bending of transducers 18 and 20 in order to obtain the signals desired therefrom. The degree of shaft flexibility selected may vary with the particular transducers to be used.

Reference is now made to FIG. 3 which schematically depicts how the input apparatus of the invention may be utilized for dynamic signature verification with an exemplary signature verification system. As shown therein, leads 24 and 26 and ground 40 of writing instrument 10 are connected to signal conditioning amplifiers 62 and 64. Signal carrying and ground wires 58 and 65 representative of downward z directional handwriting force from the FIG. 2 apparatus connect to a third signal conditioning amplifier 66. The outputs of amplifiers 62, 64 and 66 pass through conductors 68, 69 and 70, respectively, into a programmed general purpose or special hardwired computer 72 at data entry 74 go into a memory 76. Upon signature completion, the signals representative of the just completed signature are compared to stored signals from memory 76 in a comparator 78. A decision device 80 indicates whether or not signals representative of the writing dynamics of the just completed signature sufficiently match the corresponding signals representative of the dynamics of stored signatures in order to verify the writer's identity.

Figure 4A:
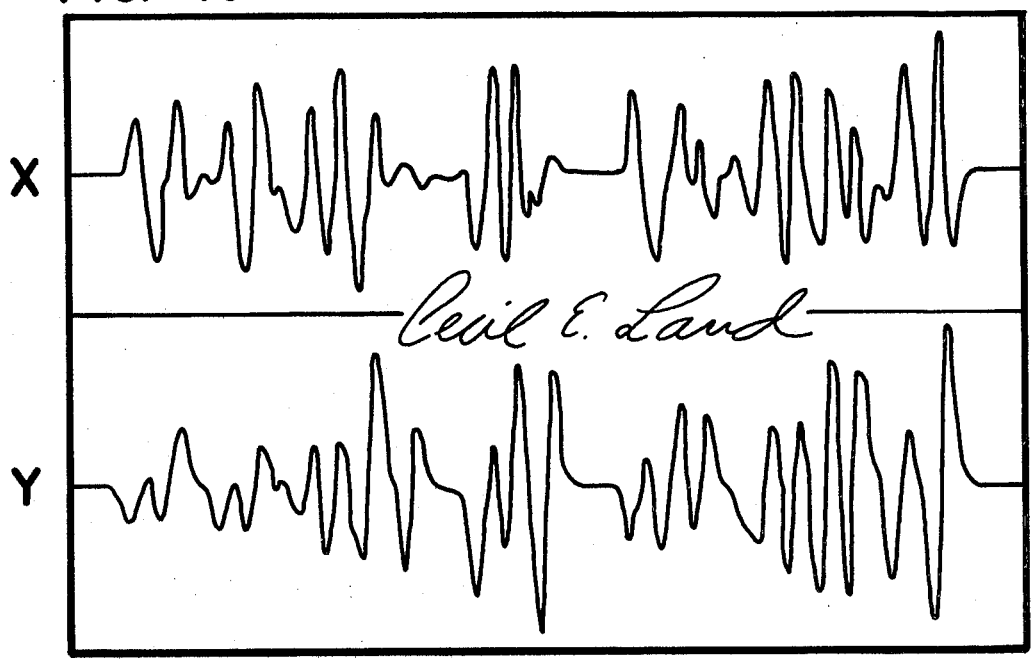
FIGS. 4a through 4d graphically depict analog signals produced by the instrument of FIG. 1 and the signatures which they represent.
Figure 4B:
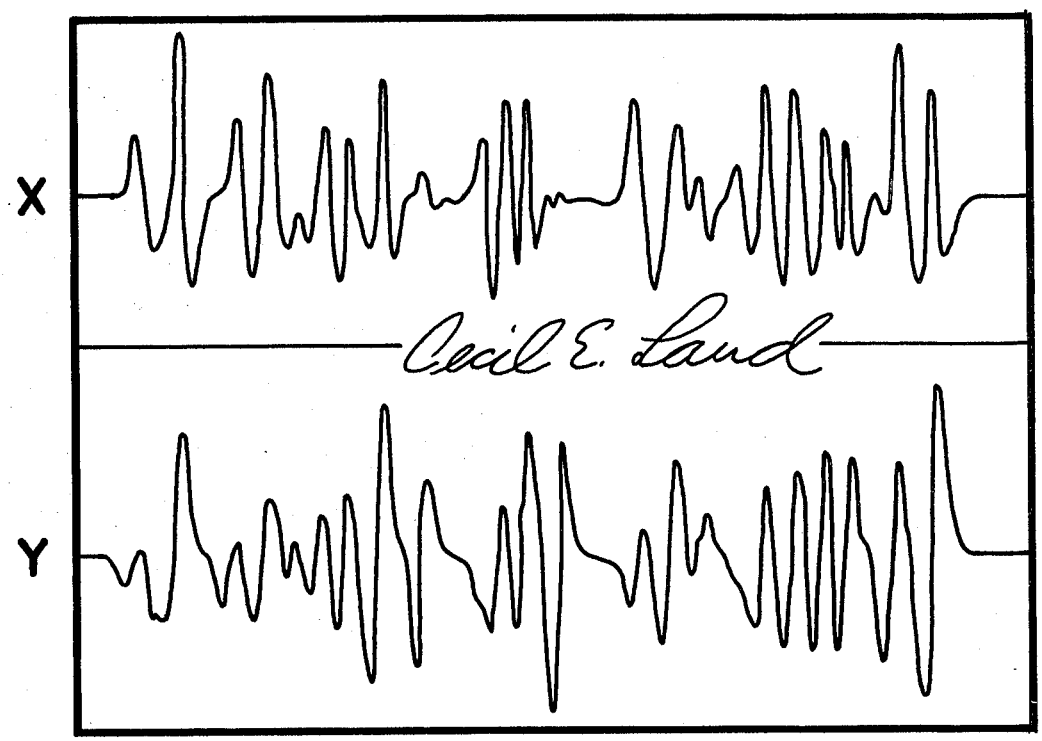
Figure 4C:
Figure 4D:
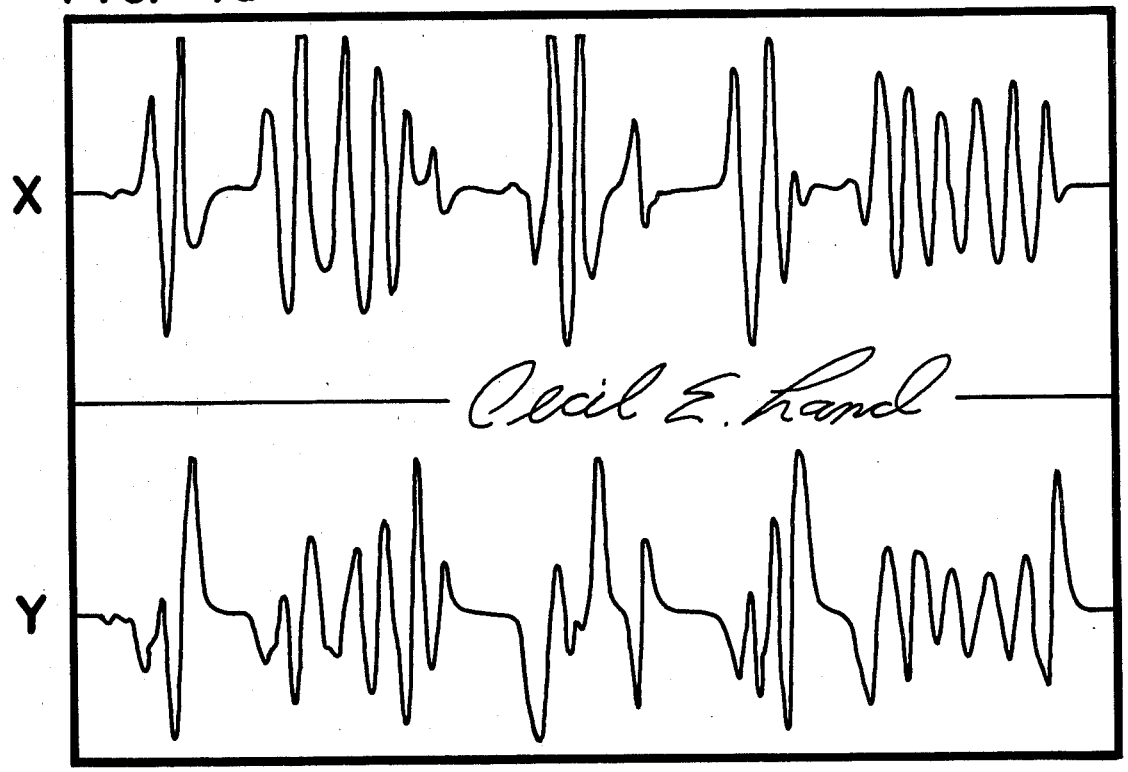

FIGS. 4a, 4b and 4c show records of the analog output signals of the preferred embodiment pen of FIG. 1 for three legitimate signatures. FIG. 4d illustrates such output signals for one reasonably good forgery. All of the analog signals shown in FIGS. 4a–4d are representative of the $x$ and $y$ axes forces on the pen point during signature writing. The analog signals were recorded as a function of time, and both the time scale and the amplification factor remained unchanged during the recording process. It will be noted that the details of the recordings of FIGS. 4a, 4b and 4c are similar, whereas the recording of the forgery, FIG. 4d, differs significantly from the recordings of the genuine signatures. For signature verification, values of certain characteristic variables of the analog signals associated with the signatures are selected and stored in a computer memory. The verification process compares the values of the same variables when a signature is entered into the computer with those values previously stored in the computer memory. When this comparison is effected for both $x$- and $y$-axis dynamics of the pen point as well as $z$-axis dynamic forces produced during the signature process, the computer can reliably identify and accept a valid signature or reject a forgery.

The various features and advantages of the invention are thought to be clear from the foregoing description. However, various other features and advantages not specifically enumerated will undoubtedly occur to those versed in the art, as likewise will many variations and modifications of the embodiments illustrated herein, all of which may be achieved without departing from the spirit and scope of the invention as defined by the appended claims.

What is claimed is:

1. A writing instrument for producing at least two output signals each of which is representative of a different directional component of an individual's handwriting action for signature verification, comprising: a flexible shaft having a longitudinal axis for holding an inscribing tip to be applied by a writer using said instrument to a writing surface, a first piezoelectric element fixedly secured to and extending along a portion of said shaft for bending concomitant with flexing of said shaft and thereby generating a first electric output signal representative of a first handwriting directional component in response to flexure in said shaft in a first direction, a second piezoelectric element fixedly secured to and extending along a portion of said shaft at a location circumferentially spaced from said first element for bending concomitant with flexing of said shaft and thereby generating a second electric output signal representative of a second handwriting directional component in response to flexure in said shaft in a second direction; and means for discretely conducting said first and second generated electric output signals representative of said first and second handwriting directional components, devoid of summing, from said first and second piezoelectric elements to an output device.

2. The invention of claim 1 wherein said inscribing tip comprises means for producing a visible record of the path of said tip on said writing surface.

3. The invention of claim 2 wherein said shaft is hollow and of a configuration to receive a ballpoint pen refill.

4. The invention of claim 1 wherein said flexible shaft is conductive and serves as a ground relative to said first and second electric output signals.

5. The invention of claim 1 wherein said first and second piezoelectric elements are circumferentially spaced at essentially right angles to one another.

6. The invention of claim 1 wherein said first and second piezoelectric elements comprise bimorph piezoelectric transducers.

7. The invention of claim 1 wherein said first and second piezoelectric elements are affixed adjacent said shaft and parallel to said shaft's longitudinal axis which, in response to any flexing thereof, generate electric output signals.

8. The invention of claim 7 wherein said first and second piezoelectric elements are affixed contiguous to said shaft.

9. The invention of claim 7 wherein said piezoelectric elements are located at right angles to one another with reference to the longitudinal axis of the shaft.

10. The invention of claim 1 wherein said writing instrument is of conventional writing instrument size and said first and second piezoelectric elements are contiguous to said shaft and generally parallel to the longitudinal axis of said shaft each being at least about 1.5 inches long, 0.060 inch wide and 0.020 inch thick.

11. The invention of claim 1 wherein said output device comprises signal processing apparatus.

12. Apparatus for producing output signals representative of three dimensions of handwriting forces comprising: a writing instrument for hand holding comprising a plurality of piezoelectric elements which, in response to forces in two degrees of freedom exerted on said instrument by its use during handwriting, produce two separate electrical output signals representative of said forces in two degrees of freedom, a platen supported by a plurality of spaced apart piezoelectric elements which produce an electrical output signal representative of handwriting pressure on said platen, and means for discretely conducting said electrical output signals to a signal processing device.

13. The invention of claim 12 wherein said platen supporting piezoelectric elements are connected in parallel.

* * * * *